United States Patent
Ubukata

(10) Patent No.: US 11,397,168 B2
(45) Date of Patent: Jul. 26, 2022

(54) MASS SPECTROMETRY SYSTEM AND EMITTER CURRENT CONTROL METHOD

(71) Applicant: JEOL Ltd., Tokyo (JP)

(72) Inventor: Masaaki Ubukata, Tokyo (JP)

(73) Assignee: JEOL Ltd., Tokyo (JP)

(*) Notice: Subject to any disclaimer, the term of this patent is extended or adjusted under 35 U.S.C. 154(b) by 482 days.

(21) Appl. No.: 16/689,443

(22) Filed: Nov. 20, 2019

(65) Prior Publication Data

US 2020/0158700 A1 May 21, 2020

(30) Foreign Application Priority Data

Nov. 21, 2018 (JP) .............................. JP2018-218622

(51) Int. Cl.
| | |
|---|---|
| *G01N 30/72* | (2006.01) |
| *H01J 49/02* | (2006.01) |
| *H01J 49/04* | (2006.01) |
| *G01N 30/02* | (2006.01) |
| *H01J 49/00* | (2006.01) |

(52) U.S. Cl.
CPC ........ *G01N 30/7206* (2013.01); *H01J 49/022* (2013.01); *H01J 49/0422* (2013.01); *G01N 2030/025* (2013.01); *H01J 49/0009* (2013.01)

(58) Field of Classification Search
CPC .......... G01N 30/7206; G01N 2030/025; H01J 49/022; H01J 49/0422; H01J 49/0009; H01J 49/0031; H01J 49/168
USPC ................................ 73/23.37; 250/281, 282
See application file for complete search history.

(56) References Cited

U.S. PATENT DOCUMENTS

| | | | |
|---|---|---|---|
| 5,644,129 A | 7/1997 | Hsu et al. | |
| 2004/0089802 A1* | 5/2004 | Kato ................... | H01J 49/0045 250/288 |
| 2007/0075240 A1* | 4/2007 | Hieke .................... | H01J 37/08 250/282 |
| 2007/0181796 A1 | 8/2007 | Hsu et al. | |
| 2008/0070314 A1 | 3/2008 | Geromanos et al. | |
| 2016/0025691 A1* | 1/2016 | Tan ....................... | G01N 30/72 702/23 |

FOREIGN PATENT DOCUMENTS

| | | |
|---|---|---|
| CN | 104345103 A | 2/2015 |
| JP | S5641665 A | 4/1981 |

(Continued)

OTHER PUBLICATIONS

Office Action issued in JP2018218622 dated Jan. 19, 2021.
Extended European Search Report issued in EP19210194.7 dated Apr. 6, 2020.

*Primary Examiner* — Jason L McCormack
(74) *Attorney, Agent, or Firm* — The Webb Law Firm

(57) ABSTRACT

Mass spectrometry for a specimen is repeatedly performed while stepwise changing a parameter (for example, a current value) of an emitter current. Based on a plurality of chromatograms generated by this process, an evaluation value table including a plurality of evaluation values is generated. An individual evaluation value shows a degree of tailing for individual peak included in each chromatogram. A parameter function is generated based on the evaluation value table. The parameter of the emitter current is controlled according to the parameter function.

9 Claims, 12 Drawing Sheets

(56) References Cited

FOREIGN PATENT DOCUMENTS

| JP | 2002170518 A | 6/2002 |
|---|---|---|
| JP | 2007538260 A | 12/2007 |
| JP | 2012202682 A | 10/2012 |
| JP | 201568678 A | 4/2015 |

* cited by examiner

FIG.11

| n-Alkane RT(min) | 5msec | 10msec | 15msec | 20msec | 25msec | 30msec | 35msec | 40msec | 45msec | 50msec |
|---|---|---|---|---|---|---|---|---|---|---|
| 2.51 | 1.0 | 1.0 | 1.0 | 1.0 | 1.0 | 1.0 | 1.0 | 1.0 | 1.0 | 1.0 |
| 4.38 | 1.2 | 1.1 | 1.1 | 1.0 | 1.0 | 1.0 | 1.0 | 1.0 | 1.0 | 1.0 |
| 6.14 | 1.2 | 1.2 | 1.2 | 1.1 | 1.1 | 1.0 | 1.0 | 1.1 | 1.1 | 1.1 |
| 7.71 | 1.3 | 1.2 | 1.2 | 1.2 | 1.2 | 1.1 | 1.0 | 1.1 | 1.1 | 1.1 |
| 9.14 | 1.3 | 1.3 | 1.3 | 1.2 | 1.2 | 1.2 | 1.1 | 1.1 | 1.1 | 1.1 |
| 10.43 | 1.3 | 1.3 | 1.3 | 1.3 | 1.3 | 1.2 | 1.1 | 1.1 | 1.0 | 1.1 |
| 11.63 | 1.3 | 1.3 | 1.3 | 1.3 | 1.3 | 1.3 | 1.2 | 1.1 | 1.1 | 1.1 |
| 12.74 | 1.3 | 1.3 | 1.3 | 1.3 | 1.3 | 1.3 | 1.2 | 1.2 | 1.1 | 1.1 |
| 13.72 | 1.4 | 1.4 | 1.4 | 1.4 | 1.4 | 1.4 | 1.3 | 1.2 | 1.1 | 1.1 |
| 14.68 | 1.5 | 1.5 | 1.5 | 1.5 | 1.5 | 1.5 | 1.5 | 1.3 | 1.1 | 1.1 |
| 15.54 | 1.6 | 1.6 | 1.6 | 1.6 | 1.6 | 1.6 | 1.5 | 1.3 | 1.1 | 1.1 |
| 16.38 | 1.8 | 1.8 | 1.8 | 1.8 | 1.8 | 1.6 | 1.5 | 1.3 | 1.2 | 1.1 |
| 17.16 | 1.9 | 1.7 | 1.6 | 1.6 | 1.6 | 1.7 | 1.5 | 1.3 | 1.2 | 1.1 |
| 17.92 | 2.3 | 2.2 | 2.2 | 2.0 | 2.0 | 1.8 | 1.6 | 1.4 | 1.2 | 1.1 |
| 18.63 | 2.3 | 2.2 | 2.2 | 2.0 | 2.0 | 1.8 | 1.6 | 1.4 | 1.2 | 1.1 |

ASYMMETRY COEFFICIENT

MASS SPECTROMETRY SYSTEM AND EMITTER CURRENT CONTROL METHOD

CROSS-REFERENCE TO RELATED APPLICATION

This application claims priority to Japanese Patent Application No. 2018-218622 filed Nov. 21, 2018, the disclosure of which is hereby incorporated by reference in its entirety.

BACKGROUND OF THE INVENTION

Field of the Invention

The present disclosure relates to a mass spectrometry system and a method of controlling an emitter current, and in particular to control of an emitter current supplied to an ion source.

Description of Related Art

A mass spectrometry system is formed from, for example, a gas chromatograph apparatus and a mass spectrometry apparatus. In the gas chromatograph apparatus, a measurement target specimen which is a mixture is timewise separated into a plurality of components; that is, a plurality of compounds. These compounds are sequentially sent to the mass spectrometry apparatus, and mass is analyzed for each compound. With this process, a mass spectrum is acquired for each compound, and a chromatogram is generated for a series of the compounds.

The mass spectrometry apparatus generally comprises an ion source, a mass spectrometry unit, and a detector. Of these elements, the ion source ionizes a specimen introduced thereto. As such an ion source, there is known an ion source which follows a field ionization (FI) method. In this ion source, a high voltage is applied between an emitter functioning as an anode and an electrode functioning as a cathode. With the high voltage, a strong electric field is generated near the emitter. The specimen is ionized by the electric field. The FI method is a soft ionization method in which fragmentation does not tend to occur.

In the ion source which follows the FI method, adhesion of the specimen (for example, an organic compound) to a surface of the emitter occurs. Such an adhesion of specimen consequently causes tailing in each peak in the chromatogram. Thus, a current is applied to the emitter to heat the emitter, and to vaporize the specimen adhered to the emitter, so that the specimen is detached from the emitter. On the other hand, measurement sensitivity is known to be reduced by the heating of the emitter. Therefore, it is desirable to handle the specimen adhesion on the emitter surface with minimum heating or while minimizing a heating temperature.

JP 2015-68678 A discloses a technique in which, in an ion source which follows the FI method, a current is applied to the emitter intermittently and for only a short period of time; that is, a technique for intermittently performing a flashing process. JP 2015-68678 A does not disclose evaluation of a shape of each peak included in the chromatogram.

In the ion source which follows the FI method, in order to prevent adhesion of the specimen or a residual specimen on the emitter; that is, in order to promote detachment, an emitter current must be applied to the emitter steadily or intermittently. In this case, if an amount of current is too large, reduction of the sensitivity may occur. On the other hand, if the amount of current is too small, the specimen residue occurs more easily. When the amount of current for the emitter current is always set at a constant regardless of the specimen or regardless of a change in a measurement situation, it becomes difficult to achieve both prevention of the specimen residue and prevention of the sensitivity reduction. It should also be noted that this problem may also occur in ion sources of types other than the ion source following the FI method.

An advantage of the present disclosure lies in allowing setting of an emitter current condition suited for the situation. Alternatively, an advantage of the present disclosure lies in dynamic control of the emitter current in a process of mass spectrometry on a plurality of compounds which are timewise separated.

SUMMARY OF THE INVENTION

According to one aspect of the present disclosure, there is provided a mass spectrometry system comprising: a mass spectrometry apparatus; a power supply; an evaluator; a determiner; and a controller. The mass spectrometry apparatus includes an ion source which generates ions. The power supply supplies an emitter current to an emitter of the ion source. The evaluator calculates an evaluation value for a peak shape based on a chromatogram generated based on an output signal of the mass spectrometry apparatus. The determiner determines a parameter, which defines the emitter current, based on the evaluation value. The controller controls the power supply and controls the emitter current according to the determined parameter.

A shape of the peak in the chromatogram changes according to presence or absence of adhesion of the specimen or an amount of adhesion of the specimen on the emitter of the ion source. For example, when the amount of adhesion of the specimen on the emitter increases, a degree of tailing in the peak becomes larger. The above-described structure presumes such a cause-and-effect relationship, and determines a parameter for the emitter current based on an evaluation value of the peak shape. The parameter is an emitter current condition which defines the emitter current, and specific examples thereof include a current value, a duration, and the like.

According to another aspect of the present disclosure, the mass spectrometry apparatus is formed from a plurality of physical devices, including an ion source. The power supply is an electric circuit. The evaluator, the determiner, and the controller correspond to a plurality of functions realized by one or more processors. The one or more processors may be formed from devices which execute information process such as a CPU, a GPU, and an ASIC. Alternatively, the one or more processors may be formed from a plurality of devices.

According to another aspect of the present disclosure, a gas chromatograph apparatus is provided upstream of the mass spectrometry apparatus. A plurality of specimens separated by the gas chromatograph apparatus are sequentially introduced into the ion source. So long as the cause-and-effect relationship similar to the above holds true, another specimen separation apparatus may be provided upstream of the mass spectrometry apparatus. According to another aspect of the present disclosure, the ion source is an ion source which follows a field ionization method. Alternatively, there may be employed an ion source of other types in which unnecessary specimen adhesion onto the emitter may be caused. In an exemplary configuration of the present disclosure, the emitter current is supplied to the emitter as an intermittent current pulse, but alternatively, the above-described structure may be employed in a structure in which the emitter current is constantly supplied to the emitter.

According to another aspect of the present disclosure, the controller includes a trial controller which controls the power supply so that a plurality of emitter currents following a plurality of provisional parameters having different magnitudes from each other are sequentially supplied to the ion source. With the control by the trial controller, a plurality of chromatograms corresponding to the plurality of provisional parameters are generated. The evaluator calculates a plurality of evaluation values corresponding to the plurality of provisional parameters based on the plurality of chromatograms. The determiner determines the parameter based on the plurality of evaluation values.

According to the above-described structure, by setting a plurality of provisional parameters as a trial, it is possible to find a superior parameter based on the result of the trail. Desirably, a number of provisional parameters (number of intervals) is determined based on time required for the trial control, a necessary parameter precision, or other conditions.

According to another aspect of the present disclosure, each of the plurality of chromatograms includes a peak array including a plurality of peaks generated under a common provisional parameter. The evaluator calculates an evaluation value array including a plurality of evaluation values based on the peak array included in each of the plurality of chromatograms. An evaluation value table is formed from a plurality of evaluation value arrays corresponding to the plurality of provisional parameters. The determiner generates a parameter function showing a change with respect to time of the parameter based on the evaluation value table. The controller controls the emitter current according to the parameter function.

According to the above-described structure, the emitter current can be optimized at each time on a time axis. For example, the parameter function may be automatically generated from the evaluation value table, or the parameter function may be generated by a user selection on the evaluation value table. The parameter function corresponds to a parameter graph, a parameter curve, a parameter pattern, or the like.

According to another aspect of the present disclosure, the determiner generates the parameter function by identifying a parameter which satisfies a parameter selection condition for each time of interest on the evaluation value table. When the chromatograph apparatus is connected upstream of the mass spectrometry apparatus, the time of interest corresponds to a retention time. In an exemplary configuration of the present disclosure, for each retention time corresponding to the peak, a parameter, among parameters generating evaluation values satisfying a predetermined condition, which can reduce the heating temperature to the largest degree is selected. In other words, for each retention time, there is selected a parameter which can achieve both prevention of the specimen adhesion and sensitivity improvement.

According to another aspect of the present disclosure, the evaluation value is an evaluation value showing a degree of distortion of the peak shape. For example, the evaluation value is an asymmetry coefficient, a symmetry coefficient, or a tailing coefficient. These coefficients are coefficients which show a degree of tailing. According to another aspect of the present disclosure, the chromatogram is a total ion current chromatogram or a mass chromatogram. When the masses of the compounds which are timewise separated are known, in general, the mass chromatogram is used. When the mass chromatogram is used, the influence of background noise is low.

According to another aspect of the present disclosure, there is provided a method of controlling an emitter current comprising a plurality of steps. In a first step, a plurality of chromatograms are generated by performing mass spectrometry while stepwise changing a parameter for an emitter current to be supplied to an ion source which follows a field ionization method. In a second step, an evaluation value table including a plurality of evaluation value arrays is generated by applying a peak shape evaluation on a plurality of peak arrays included in the plurality of chromatograms. In a third step, a parameter function showing a change with respect to time of the parameter is generated based on the evaluation value table. In a fourth step, the emitter current is controlled according to the parameter function.

The above-described method may be realized as a function of hardware or as a function of software. In the case of the latter, a program which executes the method is installed to an information processor via a transportable recording medium or via a network. The concept of the information processor includes a mass spectrometry apparatus, a mass spectrometry system, a personal computer, and the like.

BRIEF DESCRIPTION OF THE DRAWINGS

Embodiment(s) of the present disclosure will be described based on the following figures, wherein:

FIG. 11 is a diagram showing a second example of the evaluation value table;

DESCRIPTION OF THE INVENTION

An embodiment of the present disclosure will now be described with reference to the drawings.

Figure 1:
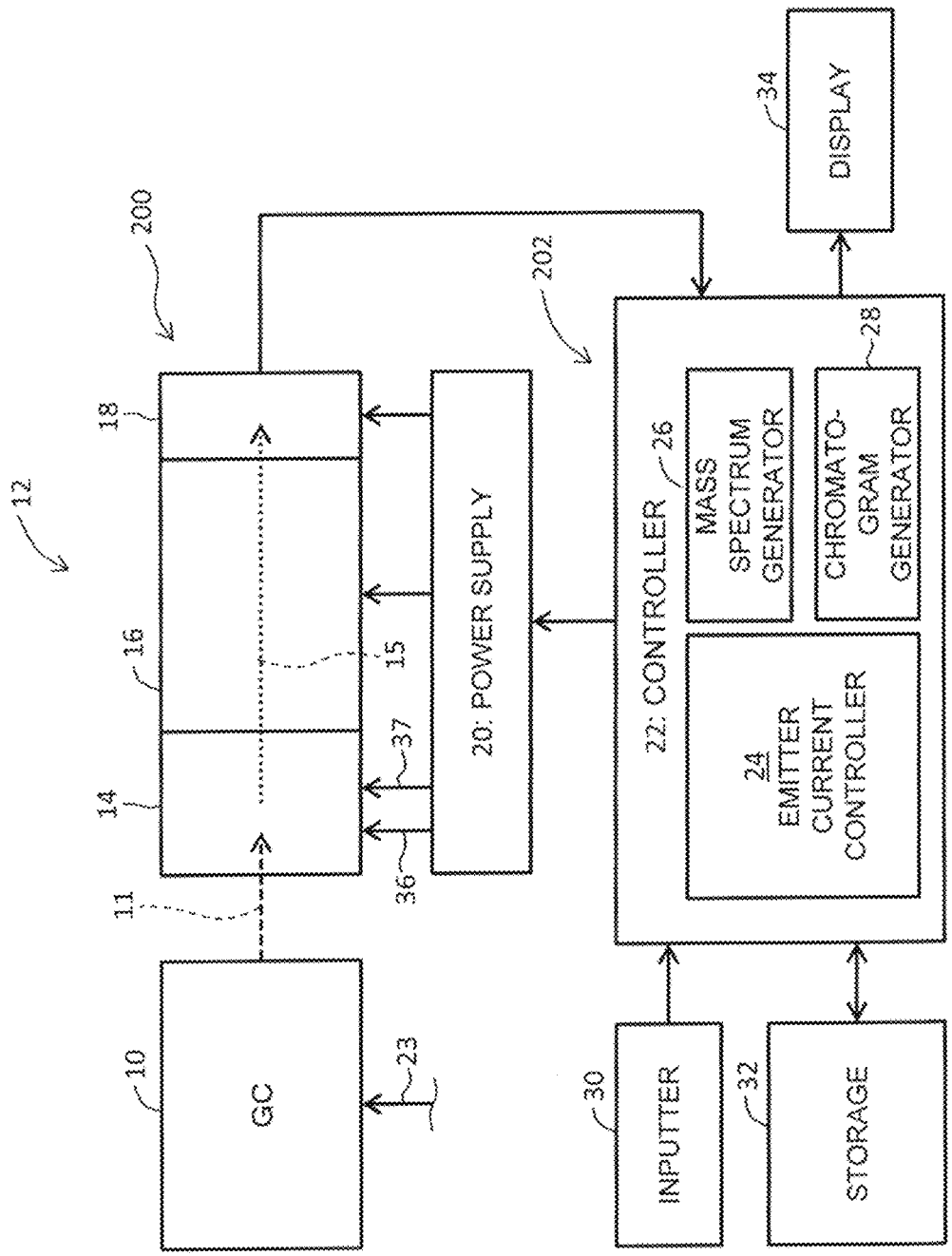
FIG. 1 is a block diagram showing a mass spectrometry apparatus according to an embodiment of the present disclosure.

FIG. 1 shows a mass spectrometry system according to an embodiment of the present disclosure. The mass spectrometry system comprises a gas chromatograph apparatus 10 and a mass spectrometry apparatus 12. The gas chromatograph apparatus 10 is an apparatus which has a column through which a mixture specimen including a plurality of compounds flows, and which timewise separates the plurality of compounds taking advantage of a difference in mobility of the compounds. The mixture specimen is, for example, an organic compound which is also a petroleum product. The plurality of compounds 11 separated by the gas chromatograph apparatus 10 are sequentially introduced into the mass spectrometry apparatus 12. The individual compound 11 is a mass spectrometry target.

The mass spectrometry apparatus 12 is formed generally from a measurer 200 and an information processor 202. The measurer 200 has an ion source 14, a mass spectrometry unit 16, and a detector 18. The measurer 200 also has a power supply 20. The information processor 202 includes a controller 22, an inputter 30, a storage 32, and a display 34. In FIG. 1, illustration of a signal processing circuit which processes an output signal of the detector 18 is omitted.

The ion source 14 is an ion source which follows a field ionization (FI) method. As will be described below with reference to FIG. 2, the ion source 14 has an emitter. The specimens 11 after the separation are sequentially introduced into the ion source 14. With this process, a plurality of ions (for example, positive ions) 15 are generated from a plurality of molecules of the specimens 11. These ions 15 are sent to the mass spectrometry unit 16 by an action of a high voltage. The mass spectrometry unit 16 is a time-of-flight type mass spectrometry unit. Alternatively, in place of the time-of-flight type mass spectrometry unit, a quadrupole type mass spectrometry unit, a magnetic field type mass spectrometry unit, or the like may be used. The mass spectrometry unit 16 separates the plurality of ions 15 based on their masses (more accurately, their m/z values). The detector 18 detects the ions 15 passing through the mass spectrometry unit 16. The detector 18 includes, for example, an electron multiplier tube. An output signal of the detector 18 is sent to the controller 22.

The power supply 20 supplies an electric power (voltage, current) or a signal necessary for operations of the ion source 14, the mass spectrometry unit 16, the detector 18, and the like, to these elements, and the controller 22 controls an operation of the power supply 20. An actual element of the power supply 20 is an electric circuit. In the present embodiment, the power supply 20 generates an emitter current 36 to be applied to the emitter of the ion source 14, and also generates a high voltage 37 for generating an electric field in the ion source 14.

The controller 22 controls operations of the measurer 200 and the power supply 20, and also executes necessary calculations. Alternatively, an operation of the gas chromatograph apparatus 10 may be controlled by the controller 22 (refer to reference numeral 23). The controller 22 is specifically formed from a computer serving as an information processor, and an actual element thereof is a processor; more specifically, a CPU and a program. Alternatively, the controller 22 may be formed by a dedicated processor, a signal processor device, or the like.

In FIG. 1, some of a plurality of functions of the controller 22 are expressed by a plurality of blocks. Specifically, the controller 22 comprises a mass spectrum generator 26, a chromatogram generator 28, and an emitter current controller 24. The mass spectrum generator 26 is a module which generates a mass spectrum based on the output signal from the detector 18. The mass spectrum is actually an accumulated mass spectrum generated by an accumulation process during a predetermined accumulation period. The mass spectrum is generated at each time on a time axis (more specifically, a retention time axis).

The chromatogram generator 28 is a module which generates a chromatogram based on the output signal of the detector 18; more specifically, based on a mass spectrum generated at each time on the time axis. As the chromatogram, a total ion current chromatogram or a mass chromatogram is selectively generated. The total ion current chromatogram shows a change with respect to time of a total ion current independent of a mass, and the mass chromatogram shows a change with respect to time of the ion current corresponding to a particular mass. The particular mass may be changed with time. In this case, a mass which is an observation target is designated at each time on the time axis. The chromatogram generator 28 also has a function to apply to the generated chromatogram a process for removing background. As this process, there may be exemplified a process to remove a waveform of less than or equal to a threshold, a process to smoothen the waveform, or the like. Viewed from peak shape evaluation to be described later, this process corresponds to a pre-process for improving evaluation precision.

The emitter current controller 24 is a module which indirectly controls the emitter current to be applied to the ion source 14 through control of the power supply 20. A parameter to be controlled in this process is, for example, a current value or a duration which defines the current pulse, or both of the current value and the duration. The emitter current control will be described later in detail.

The inputter 30 is formed from a keyboard, a pointing device, or the like. For example, according to a measurement target specimen (mixture specimen), a user selects a particular parameter function from a plurality of parameter functions defining the emitter current condition. In this process, the inputter 30 is used. Alternatively, the parameter function may be automatically selected based on an input of the measurement target specimen. The storage 32 is formed from a semiconductor memory, a hard disk drive, or the like. One or a plurality of parameter functions are registered in the storage 32. Alternatively, an evaluation value table to be described later may be stored in the storage 32. The display 34 is formed from, for example, an LCD. The display 34 displays the mass spectrum, the chromatogram, the parameter function, or the like. Alternatively, the display 34 may display the evaluation value table to be described later.

Figure 2:
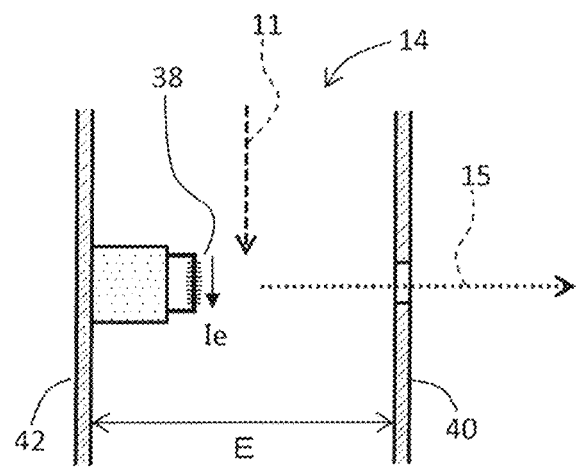
FIG. 2 is a diagram showing an ion source which follows a field ionization method.
Figure 3:
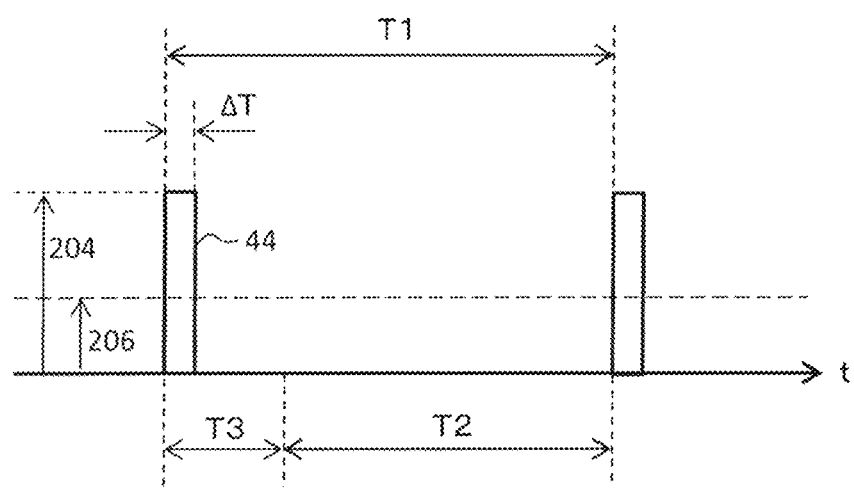
FIG. 3 is a diagram showing a current pulse train for flashing.

FIG. 2 schematically shows a structure of the ion source 14. A high voltage E is applied between an electrode 40 and an electrode 42. For example, with the electrode 40 being at a reference potential (ground), a direct current voltage of $-8 \sim -10$ kV is applied to the electrode 42. The ion source 14 has an emitter 38. The emitter 38 is formed from, for example, tungsten, and a large number of small-size whiskers are formed on a surface of the emitter 38. Of respective terminals of the emitter 38, one terminal is connected to the electrode 42. In other words, the high voltage E is applied between the emitter 38 and the electrode 40. Normally, the electrode 40 functions as a cathode, and the emitter 38 functions as an anode. An emitter current Ie which is a current pulse is intermittently applied to the emitter 38 for the above-described flashing process. When the specimen 11 in the gas phase is introduced into the ion source 14, molecules of the specimen 11 are ionized by an action of the electric field; in particular, a high electric field around the emitter 38, and the ions (positive ions) 15 are generated. The ions 15 are attracted to the side of the mass spectrometry unit by an action of the electric field, FIG. 3 shows a current pulse train supplied to the emitter. T1 shows a pulse repetition period. A height 204 of individual current pulse 44 shows a current value of the emitter current. A width $\Delta T$ of individual current pulse 44 shows a duration for which the emitter current is applied. T2 shows a mass spectrum acquisition period during one period; more specifically, the accumulation period. Specifically, in the accumulation period T2, the mass spectrum is repeatedly acquired, and the mass spectra are accumulated to generate an accumulated mass spectrum. T3 shows a measurement stop period in one period. Desirably, in the measurement stop period T3, a potential of an entrance electrode of the mass spectrometry unit is controlled so that ions do not enter the mass spectrometry unit.

In the present embodiment, as described above, the current pulse train is supplied to the emitter. In this process, dynamic control is applied to gradually increase the current value or the duration with elapse of time. Alternatively, a steady current may be supplied to the emitter. In this case, dynamic control may be applied to gradually increase a current value 206.

Figure 4:
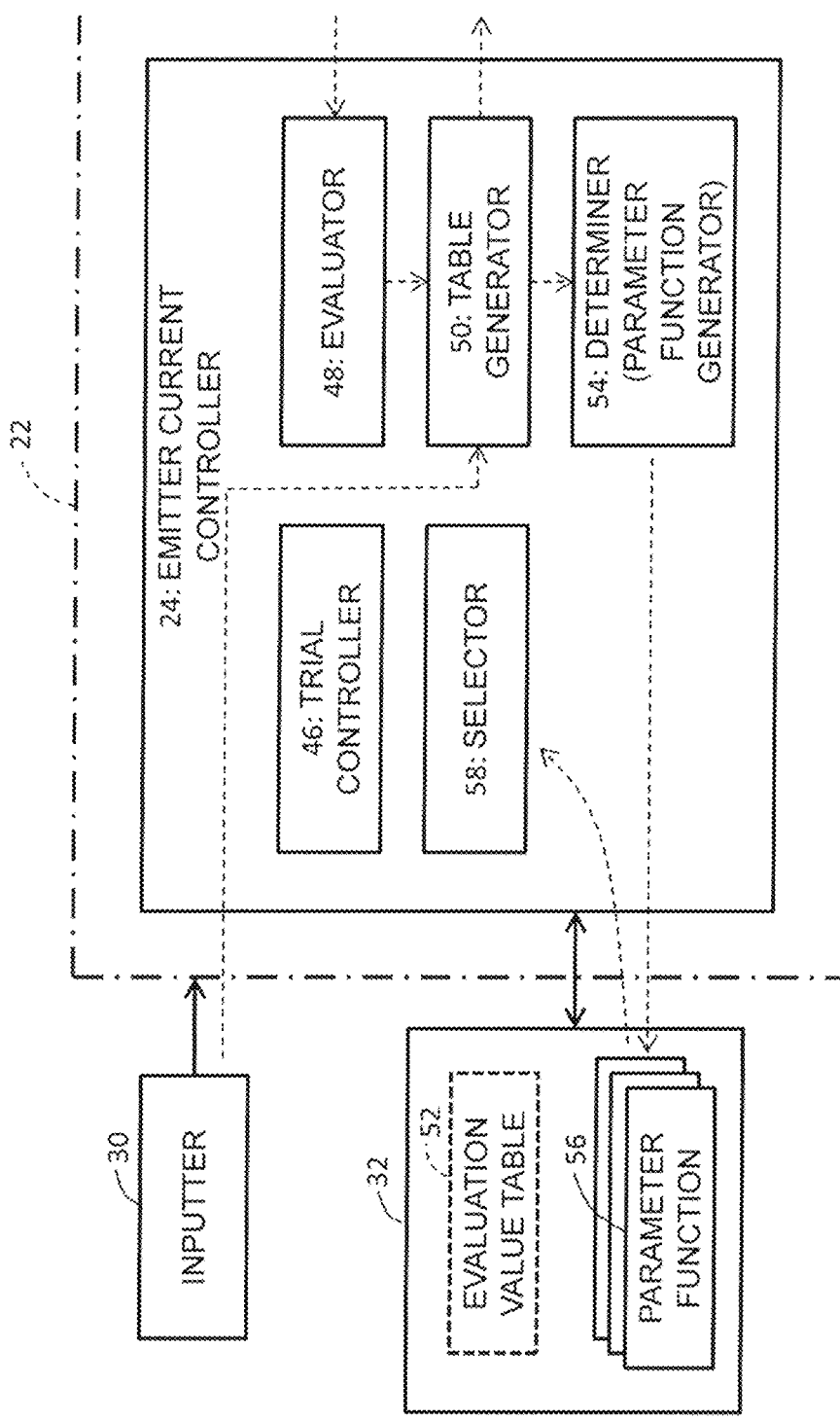
FIG. 4 is a diagram showing an example structure of an emitter current controller.

FIG. 4 shows an example structure of the emitter current controller 24 shown in FIG. 1. In the illustrated example structure, the emitter current controller 24 comprises a trial controller 46, an evaluator 48, a table generator 50, a determiner (parameter function generator) 54, a selector 58, or the like. As described above, the controller 22 is formed from a processor.

As will be described later in detail, the trial controller 46 executes control to perform, while stepwise varying a parameter for defining the ion current (specifically, a current value or a duration serving as a provisional parameter) in a parameter function generation mode executed prior to an actual measurement mode, a trial mass spectrometry at each step. During this process, the specimen introduced into the gas chromatograph apparatus may be the actual measurement target specimen, or a standard specimen corresponding to the actual measurement target specimen.

For example, when the mass spectrometry for a series of compounds separated from the mixture specimen serving as the measurement target specimen is defined as one time of measurement, in correspondence to parameter switching of n steps (that is, n parameters), measurements of n times are sequentially executed. As a result, n chromatograms are generated. Here, n is an integer greater than or equal to 2, and is, for example, 10. When it is desired to quickly generate the parameter function, n may be set to a small numerical value, and, when generation of a more precise parameter function is desired, n may be set to a large numerical value. For example, when a basic form of the parameter function is known, n may be set to 1.

The evaluator 48 evaluates a shape of each peak (compound peak) included in individual chromatogram, and calculates an evaluation value. The evaluation value shows a degree of tailing. A specific evaluation method will be described later with reference to FIG. 5. A specific example of a chromatogram array will be described later with reference to FIG. 6. Alternatively, a peak to be evaluated by the evaluator 48 may be limited. For example, in a chromatogram generated for a polymer, all peaks of a series may be set as the evaluation target, or peaks at every predetermined number may be set as the evaluation target. Alternatively, one or a plurality of peaks selected by the user may be set as the evaluation target. In the present embodiment, as an evaluation result for a plurality of peaks included in the individual chromatogram, a plurality of evaluation values are calculated. These evaluation values form an evaluation value array.

The table generator 50 generates an evaluation value table based on a plurality of evaluation value arrays calculated based on a plurality of chromatograms. A specific example of the evaluation value table will be described later with reference to FIG. 7. In one configuration, the generated evaluation value table may be stored in the storage 32 (refer to reference numeral 52). Alternatively, the evaluation value table may be displayed on the display.

The determiner 54 determines a parameter which satisfies a selection condition for each retention time corresponding to a peak based on the evaluation value table, and generates a parameter function by this determination. As will be described later, the evaluation value table has m rows corresponding to m retention times (that is, m peaks). An individual row is formed from n evaluation values arranged along a parameter axis direction. The determiner 54 determines the parameter which satisfies the selection condition based on the n evaluation values for each row. The selection condition is, for example, a condition for selecting a parameter which generates an evaluation value of less than or equal to a threshold, and which can reduce the emitter temperature to the highest degree. Corresponding to m retention times, m parameters are selected. A parameter function is generated by the m parameters. Alternatively, a post process such as shaping, smoothening, or the like may be applied to the parameter function. The generated parameter function is stored in the storage 32 (refer to reference numeral 56). An example of the parameter function will be described later with reference to FIG. 8.

Alternatively, a plurality of parameters defining the parameter function may be manually designated on the evaluation value table using the inputter 30. In this case, the determiner 54 automatically generates the parameter function based on the plurality of designated parameters.

After the parameter function generation mode as described, the actual measurement mode is executed. In the actual measurement mode, a specimen (mixture) which is the measurement target is introduced into the gas chromatograph apparatus. According to a parameter function corresponding to the specimen, the emitter current is dynamically controlled during the measurement of the specimen. The control of the emitter current is executed by the emitter current controller 24. Alternatively, the actual measurement mode may be immediately executed without going through the parameter function generation mode. In this case, for example, the user may select a parameter function suitable for the specimen from a plurality of parameter functions which have already been generated. Alternatively, the parameter function may be automatically selected based on a designation of the specimen by the user.

By controlling the emitter current based on the parameter function suitable for the specimen, it is possible to optimize the emitter current during each retention time, and the waveform of each peak may consequently be set to a superior waveform. Furthermore, it becomes possible to realize a superior level of sensitivity over the entirety of the measurement period. A chromatogram generated with the emitter current control will be exemplified and described later with reference to FIG. 9.

Figure 5:
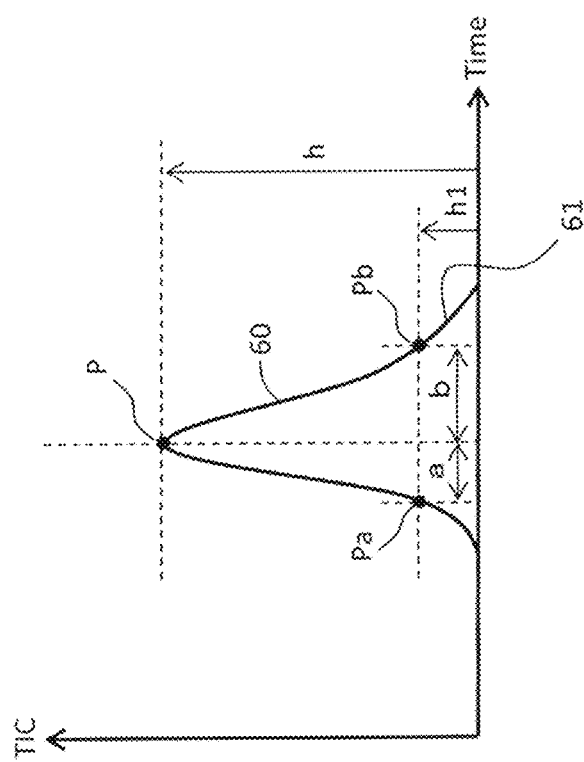
FIG. 5 is a diagram for explaining a peak shape evaluation method.

FIG. 5 exemplifies an evaluation method of the peak shape. In FIG. 5, a peak 60 having a mountain-like form includes a slight tailing portion 61. When specimen adhesion to the emitter is caused, the shape of the peak 60 changes according to the degree of adhesion, and, in particular, a size of the tailing portion 61 changes. When the tailing portion 61 is generated, the waveform of the peak 60 becomes asymmetric at the left and the right. In the present embodiment, in order to evaluate the asymmetry (or symmetry) of the peak 60, a coefficient is calculated as the evaluation value. Specifically, an asymmetry coefficient is calculated. The asymmetry coefficient is calculated in the following manner.

With a height h of an apex P of the peak 60 as a reference, for example, a height h1 which is 1/10 of the height h is identified. Then, two points Pa and Pb having the height h1 on respective bases of the peak 60 are identified. When a distance from a line of normal passing through the apex P to the point Pa is a, and a distance from the line of normal to the point Pb is b, an asymmetry coefficient As is defined as As=b/a. As the degree of the tailing becomes larger, b becomes relatively larger, and the asymmetry coefficient is also increased. Alternatively, the size of h1 may be set to 1/20 of h or the like.

Alternatively, a tailing coefficient or a symmetry coefficient may be calculated in place of the asymmetry coefficient. These coefficients are calculated, for example, by (a+b)/(2a). In either case, it is desirable to calculate a coefficient with which a distortion of the shape or the degree of tailing can be evaluated for a peak. In the calculation of the coefficient, a height of the apex, an area of the peak, or the like may be taken into consideration. Alternatively, a coefficient may be calculated as a degree of fitting to a template.

Figure 6:
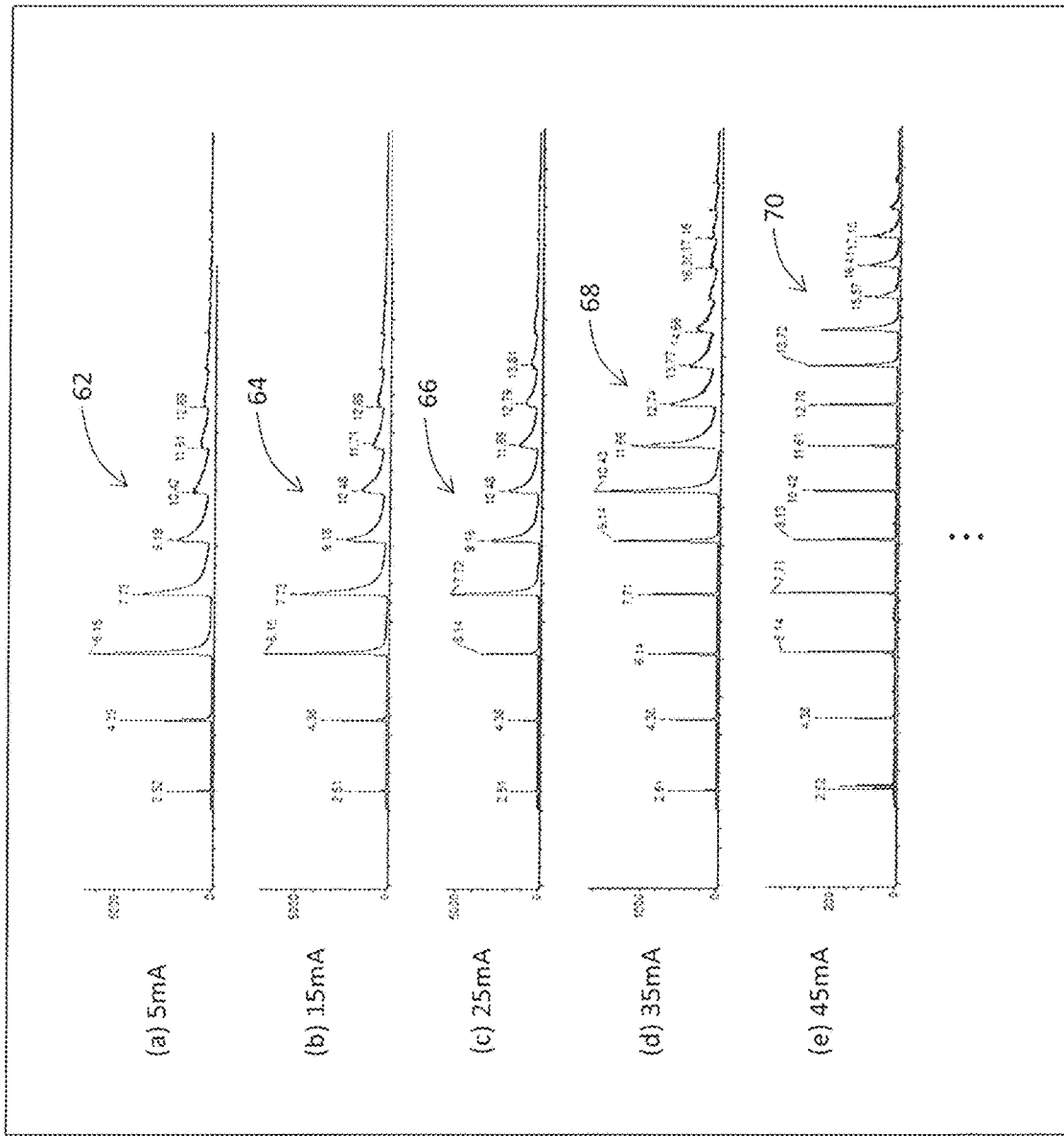
FIG. 6 is a diagram showing a plurality of chromatograms corresponding to a plurality of current values.

FIG. 6 shows a plurality of chromatograms 62~70 acquired by performing mass spectrometry while stepwise varying the current value (emitter current value) as the provisional parameter. An initial value is 5 mA, and an increment is 10 mA. Parameters other than the current value (including the duration) are common to all chromatograms. In general, on the time axis (retention time axis), the tailing tends to be more easily generated toward the right side; that is, as the retention time is increased. This may be deduced as being caused by an increase in the specimen adhesion to the emitter. When the current value is increased, the degree of tailing becomes smaller for the chromatogram as a whole. However, in this case, heating may become excessive, particularly at the left side (initial stage of measurement) on the time axis. If the chromatogram 70 acquired with the current value of 45 mA is viewed, tailing which cannot be ignored is observed in some peaks at a right side end on the time axis. For these peaks, the current value needs to be increased more.

Figure 7:
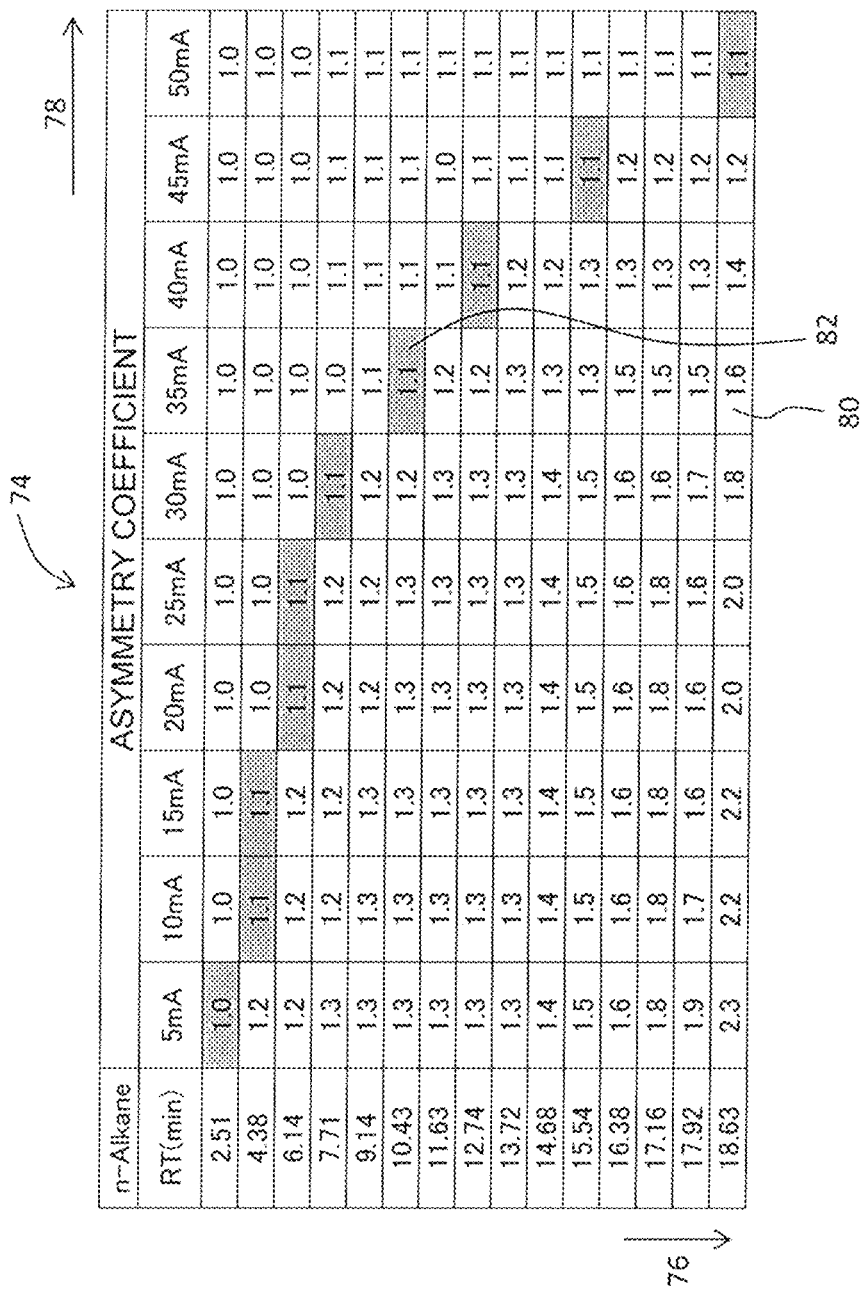
FIG. 7 is a diagram showing a first example of an evaluation value table.

FIG. 7 exemplifies an evaluation value table 74. A horizontal axis 78 shows an increasing direction of the current value, and a vertical axis 76 shows an increasing direction of the retention time. The target specimen is n-alkanes. As described above, the initial value of the current value is 5 mA, and the increment is 5 mA. An upper limit is 50 mA. In this case, a number of steps n is 10.

The evaluation value table 74 is formed from n evaluation value arrays acquired in n measurements (corresponding to n current values). An individual evaluation value array is formed from m evaluation values (asymmetry coefficients) arranged along the retention time axis.

In the illustrated example configuration, m is 15, but this number is merely exemplary. In individual evaluation value array, there is a tendency that, with the increase in the retention time, the evaluation value is increased (degraded). From another viewpoint, the evaluation value table 74 is made of m rows corresponding to m retention times, and individual row is formed from n evaluation values. In an individual row, there is a tendency that, with the increase of the current value, the evaluation value is reduced (improved).

In the present embodiment, for each retention time where the peak occurs, a row (n evaluation value) corresponding thereto is referred to, and a current value which satisfies the selection condition is selected. In the present embodiment, the selection condition is a condition to select the smallest current value from current values which result in evaluation values of less than or equal to the threshold. In the present embodiment, 1.1 is set as the threshold, and a current value which satisfies the selection condition is selected for each retention time; that is, for each row. For example, for the retention time of 10.43 min., with the increase of the current value, the asymmetry coefficient changes from 1.3 to 1.1. A cell which has the asymmetry coefficient less than or equal to the threshold of 1.1 and which corresponds to the smallest current value is a cell 82. Thus, a current value of 35 mA corresponding to the cell 82 is identified as the best current value. Reference numeral 80 shows a groups of cells which do not satisfy the threshold condition.

In the above description, the threshold is set at a fixed value. Alternatively, the threshold may be a variable value. For example, with the increase of the retention time, the threshold may be increased at a certain ratio. Alternatively, a plurality of segments may be set on the retention time axis, and a threshold may be determined for each segment.

Figure 8:
FIG. 8 is a diagram showing a first example of a parameter function.

FIG. 8 shows an example of the parameter function generated by the process as described above. A parameter function 88 is generated based on the evaluation value table shown in FIG. 7. A horizontal axis shows the time, and a vertical axis shows the current value. In the process of actually measuring the specimen, the current value is dynamically changed according to the parameter function 88. In this case, the other parameters (for example, the duration) are maintained. In an exemplary configuration, a linear parameter function, a parameter function formed by a curved line, or the like may be determined.

Figure 9:
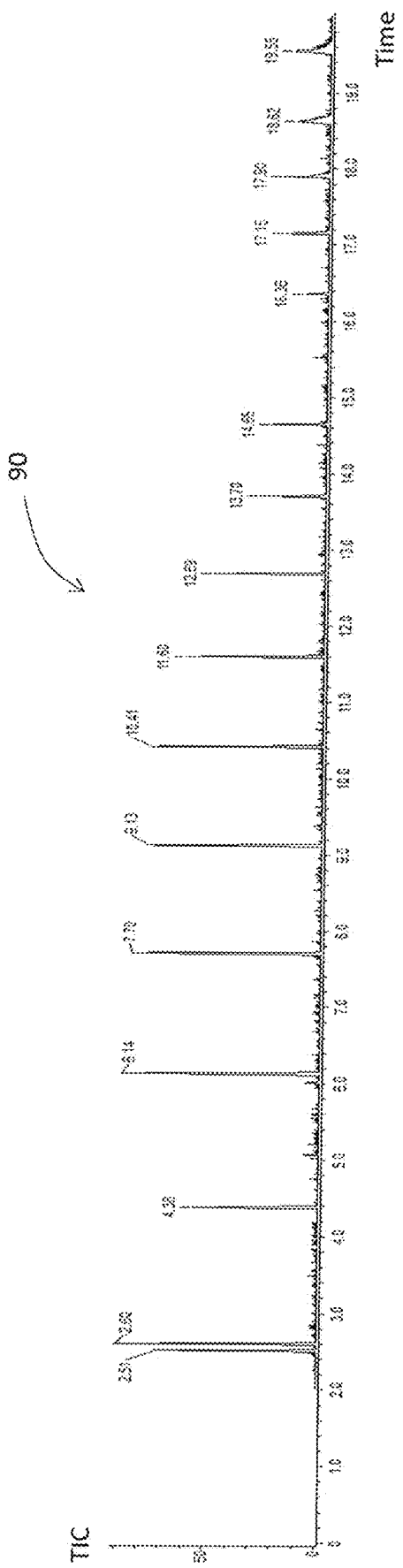
FIG. 9 is a diagram showing a chromatogram acquired by application of a parameter function.

FIG. 9 shows a chromatogram 90 generated with the application of the parameter function shown in FIG. 8. A horizontal axis shows the time, and a vertical axis shown a total ion current (TIC). That is, the chromatogram 90 is the total ion current chromatogram. Over the entirety of the time axis, the asymmetry coefficients of the peaks are set to be less than or equal to 1.1. Further, unnecessary, excessive emitter heating is avoided. In other words, ideal emitter current control is realized.

Figure 10:
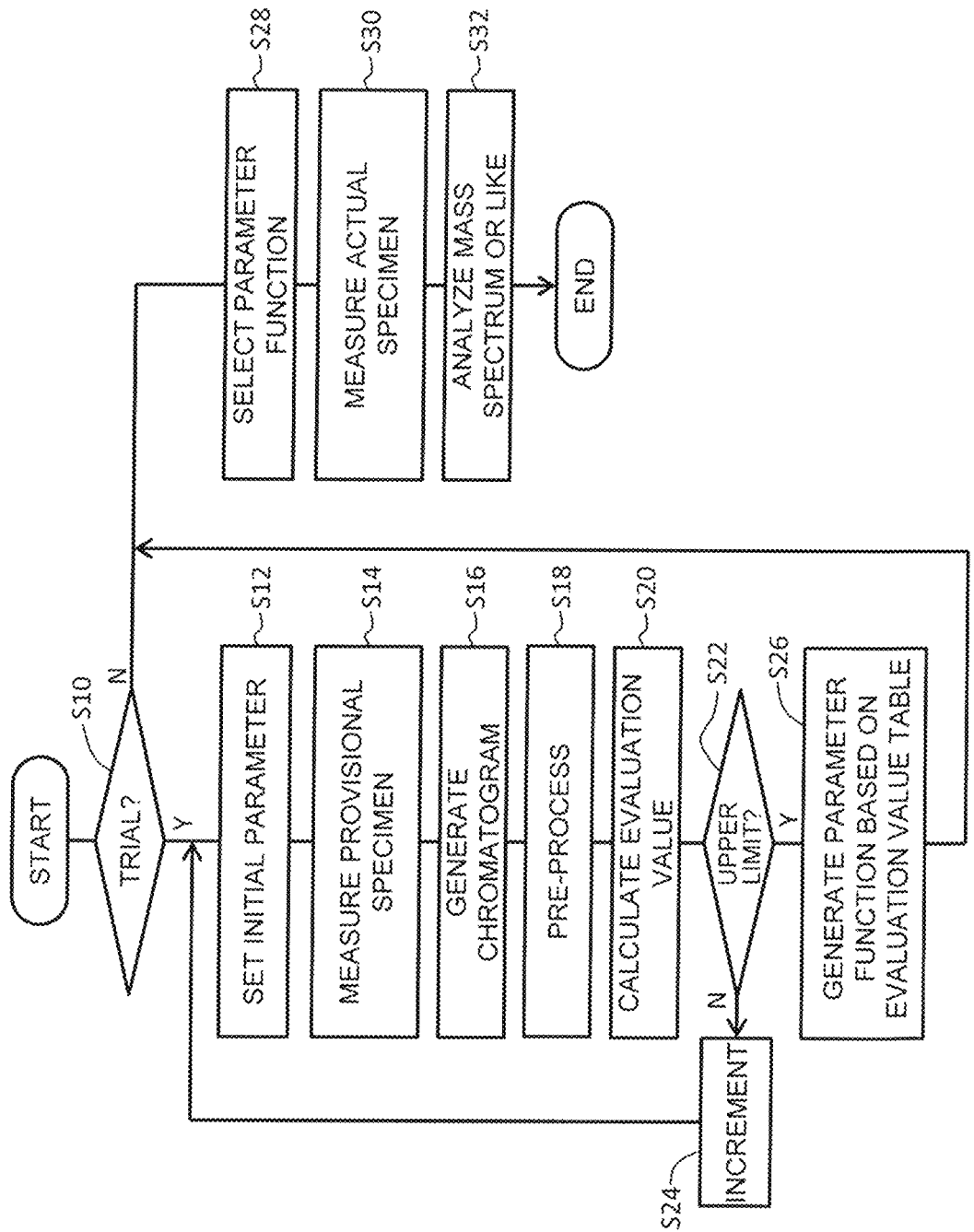
FIG. 10 is a flowchart showing an example operation.

FIG. 10 shows an operation of the mass spectrometry system shown in FIG. 1; in particular, an operation related to the emitter current control, as a flowchart. In S10, it is judged whether or not the parameter function generation mode (trial control) is to be executed. When the user selects the parameter function generation mode, processes from S12 and on are executed. On the other hand, when the actual measurement mode is selected, processes from S28 and on are executed.

In S12, an initial value is set as a parameter (provisional parameter). For example, 5 mA is set as the current value of the emitter current. Desirably, a configuration is employed which allows the user to set the initial value, the increment, and the upper limit. In S14, a specimen (provisional specimen) is introduced into the gas chromatograph apparatus, and mass spectrometry is performed for the plurality of compounds separated by the gas chromatograph apparatus. As the provisional specimen, desirably, a specimen identical to the actual specimen is used, but alternatively, a standard specimen corresponding to the actual specimen may be used. In S16, a chromatogram is generated based on the mass spectrum measurement result of S14. As the chromatogram, the total ion current chromatogram or the mass chromatogram is generated. Normally, the total ion current chromatogram is generated, but when the values of m/z for the compound ions generated at various times are known, the mass chromatogram may be generated by selecting the respective m/z value at each time.

In S18, a pre-process is applied as necessary to the chromatogram generated in S16. For example, a process to remove peaks of less than or equal to a threshold, a process to smoothen a waveform, or the like is executed. In S20, the evaluation value is calculated for each peak by the shape evaluation of the peaks included in the chromatogram. As the evaluation value, the asymmetry coefficient showing the degree of distortion of the waveform is calculated. Peaks for which the calculation is to be carried out may be selected automatically or by the user. Alternatively, a small number of representative peaks may be automatically selected. As a result of the execution of S20, the evaluation value array including a plurality of evaluation values corresponding to a plurality of peaks is generated.

In S22, it is judged whether or not the parameter has reached the upper limit, and when the parameter has not reached the upper limit, the parameter is increased by a predetermined increment in S24. For example, when the increment is 5 mA, 5 mA is added to 5 mA which is the previous current value, to set 10 mA as a new parameter. Then, the processes from S12 and on are repeatedly executed.

On the other hand, when it is judged in S22 that the parameter has reached the upper limit, a parameter function is generated in S26 based on the evaluation value table. For example, an optimum current value is automatically selected for each peak arranged along the time axis. In this case, for example, the smallest current value with the asymmetry coefficient less than or equal to the threshold is selected. This is for reducing the heating temperature of the emitter while preventing the adhesion to the emitter as much as possible.

Next, in S28, the parameter function which is generated is actually set or selected, and activated. For the measurement of the actual specimen (actual measurement) in S30, the emitter current is dynamically controlled according to the parameter function. In S32, the mass spectrum or the like acquired by the actual measurement is analyzed. With this process, qualitative analysis, quantitative analysis, or the like of the individual compound is executed.

Figure 12:
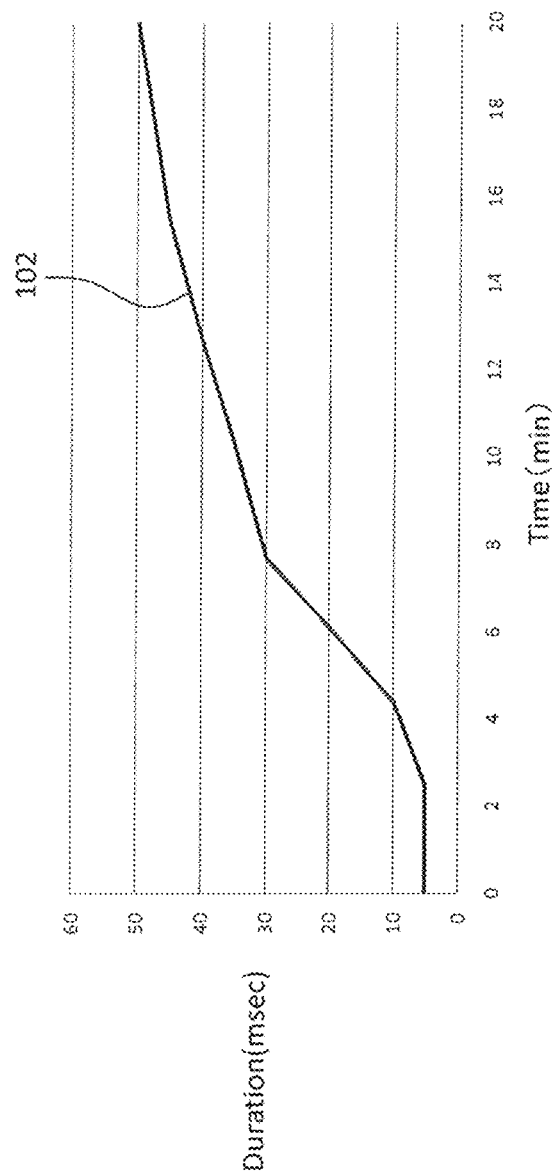
FIG. 12 is a diagram showing a second example of the parameter function.

FIGS. 11 and 12 show another parameter control. In this control, the duration is controlled in place of the current value. The flashing condition can also be adjusted by the control of the duration.

FIG. 11 shows an evaluation value table 92. The evaluation value table 92 is generated by changing the duration from 5 msec. to 50 msec. with an increment of 5 msec., while setting the current value constant. A vertical axis shows the retention time and a horizontal axis shows the duration. For each retention time, a duration which satisfies a selection condition is selected. For example, the shortest duration which results in the asymmetry coefficient of less than or equal to a threshold of 1.1 is selected. Reference numeral 100 shows a cell which satisfies the condition. The duration corresponding to this cell is 35 msec. A cell 98 shows a cell in which the asymmetry coefficient exceeds the threshold. Alternatively, the threshold forming the selection condition may be dynamically changed. By selecting a duration which satisfies the selection condition for each retention time, a parameter function which shows a change with respect to time of the duration is defined.

FIG. 12 shows a parameter function 102 generated based on the evaluation value table described above. A horizontal axis shows the time axis (retention time axis), and a vertical axis shows the duration. The duration is increased according to the parameter function 102 with the elapsed time from the start of the mass spectrometry, and the heating temperature during the flashing process is consequently increased. As a result, the problem due to adhesion of the specimen can be prevented or reduced, and, at the same time, the measurement sensitivity can be improved.

Alternatively, while changing a combination of the current value and the duration as parameters, the shapes of the peaks in the chromatogram may be evaluated for each combination, and a three-dimensional evaluation value table may be thereby formed. With the three-dimensional evaluation value table formed, a combination which satisfies the selection condition may be selected for each retention time corresponding to the peak, and a parameter function set as shown in FIG. 13 may be thereby generated.

Figure 13:
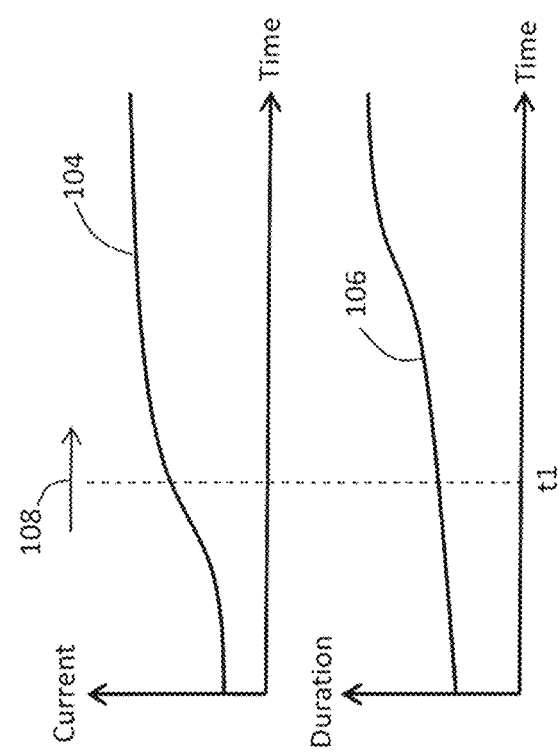
FIG. 13 is a diagram showing control of a current value and a duration.

FIG. 13 shows at an upper part a parameter function 104 which shows a change with respect to time of the current value, and at a lower part a parameter function 106 which shows a change with respect to time of the duration. At a current time t1, a combination of the current value and the duration is identified based on these functions 104 and 106, and is set. As shown by reference numeral 108, with the elapse of time, the contents of the combination are dynamically changed according to the parameter function set.

As described, according to the present embodiment, an optimum parameter suited to the situation can be found. In particular, an optimum parameter function which dynamically changes and which is suited for the situation can be found. In the above-described embodiment, the current pulse train is supplied to the emitter, but the above-described structure may be applied also in the case in which the current is steadily supplied to the emitter. Further, the above-described structure may be applied to ion sources which follows ionization methods other than the field ionization method and in which a problem similar to that described above is caused.

The invention claimed is:

1. A mass spectrometry system comprising:
a mass spectrometry apparatus that includes an ion source which generates ions;
a power supply that supplies an emitter current to an emitter of the ion source; and
one or more processors, configured to:
calculate an evaluation value for a peak shape based on a chromatogram generated based on an output signal of the mass spectrometry apparatus;
determine a parameter, which defines the emitter current, based on the evaluation value; and
control the emitter current according to the parameter.

2. The mass spectrometry system according to claim 1, wherein
the one or more processors are further configured to:
execute trial control to control the power supply so that a plurality of emitter currents following a plurality of provisional parameters having different magnitudes from each other are sequentially supplied to the ion source, wherein a plurality of chromatograms corresponding to the plurality of provisional parameters are generated by the trial control;
calculate a plurality of evaluation values corresponding to the plurality of provisional parameters based on the plurality of chromatograms; and
determine the parameter based on the plurality of evaluation values.

3. The mass spectrometry system according to claim 2, wherein
each of the plurality of chromatograms includes a peak array including a plurality of peaks generated under a common provisional parameter, and
the one or more processors are further configured to:

calculate an evaluation value array including a plurality of evaluation values based on the peak array included in each of the plurality of chromatograms, wherein an evaluation value table is formed from a plurality of evaluation value arrays corresponding to the plurality of provisional parameters;

generate a parameter function showing a change with respect to time of the parameter based on the evaluation value table; and control the emitter current according to the parameter function.

4. The mass spectrometry system according to claim 3, wherein the one or more processors are further configured to generate the parameter function by identifying a parameter which satisfies a parameter selection condition for each time of interest on the evaluation value table.

5. The mass spectrometry system according to claim 1, wherein the evaluation value is an evaluation value showing a degree of distortion of the peak shape.

6. The mass spectrometry system according to claim 5, wherein the evaluation value is an asymmetry coefficient, a symmetry coefficient, or a tailing coefficient.

7. The mass spectrometry system according to claim 1, further comprising:

a gas chromatograph apparatus provided upstream of the mass spectrometry apparatus, wherein a plurality of specimens separated by the gas chromatograph apparatus are sequentially introduced into the ion source.

8. The mass spectrometry system according to claim 1, wherein the chromatogram is a total ion current chromatogram or a mass chromatogram.

9. A method of controlling an emitter current, comprising:

generating a plurality of chromatograms by performing mass spectrometry while stepwise changing a parameter for an emitter current to be supplied to an ion source which follows a field ionization method;

generating an evaluation value table including a plurality of evaluation value arrays by applying a peak shape evaluation on a plurality of peak arrays included in the plurality of chromatograms;

generating a parameter function showing a change with respect to time of the parameter based on the evaluation value table; and controlling the emitter current according to the parameter function.

* * * * *